United States Patent
Suzuki et al.

(10) Patent No.: US 6,188,946 B1
(45) Date of Patent: Feb. 13, 2001

(54) TRANSMISSION CONTROL SYSTEM FOR AND METHOD OF AUTOMOTIVE VEHICLE WITH CONTINUOUSLY VARIABLE AUTOMATIC TRANSMISSION

(75) Inventors: Akito Suzuki; Hiroshi Asano, both of Kanagawa (JP)

(73) Assignee: Nissan Motor Co., Ltd., Yokohama (JP)

(*) Notice: Under 35 U.S.C. 154(b), the term of this patent shall be extended for 0 days.

(21) Appl. No.: 09/121,721

(22) Filed: Jul. 24, 1998

(30) Foreign Application Priority Data

Jul. 25, 1997 (JP) .................................................. 9-200029
Jul. 13, 1998 (JP) ................................................ 10-197424

(51) Int. Cl.$^7$ ............................ B60K 41/02; F16H 61/00
(52) U.S. Cl. ................................. 701/62; 701/61; 477/46
(58) Field of Search ................................. 701/51, 55, 56, 701/61, 62; 477/43, 46

(56) References Cited

U.S. PATENT DOCUMENTS

| 4,653,006 | * | 3/1987 | Osanai et al. ........................ 701/51 |
| 5,178,044 | * | 1/1993 | Suzuki et al. ........................ 74/866 |
| 5,362,287 | * | 11/1994 | Tanaka et al. ........................ 477/175 |
| 5,586,953 | * | 12/1996 | Abo ........................ 477/47 |
| 5,655,991 | * | 8/1997 | Lardy et al. ........................ 477/46 |
| 5,707,313 | * | 1/1998 | Suzuki ........................ 477/43 |
| 5,890,991 | * | 4/1999 | Sakakiyama ........................ 477/48 |

FOREIGN PATENT DOCUMENTS

| 1-79466 | 3/1989 | (JP) . |
| 4-54371 | 2/1992 | (JP) . |
| 8-178042 | 7/1996 | (JP) . |

\* cited by examiner

Primary Examiner—Tan Nguyen
(74) Attorney, Agent, or Firm—Foley & Lardner

(57) ABSTRACT

A transmission control system of an automotive vehicle with a continuously variable automatic transmission, comprises an electronic transmission control unit which detects an acceleration of a drive wheel of the vehicle, and compares the acceleration of the drive wheel to a predetermined acceleration value. The control unit operates to inhibit only the upshifting action by preventing a speed ratio of the continuously variable automatic transmission from being upshifted toward a speed ratio less than a predetermined upshift limiting threshold.

18 Claims, 5 Drawing Sheets

US 6,188,946 B1

TRANSMISSION CONTROL SYSTEM FOR AND METHOD OF AUTOMOTIVE VEHICLE WITH CONTINUOUSLY VARIABLE AUTOMATIC TRANSMISSION

BACKGROUND OF THE INVENTION

1. Field of the Invention

The present invention relates to a transmission control system for and method of an automotive vehicle employing a continuously variable automatic transmission, and specifically to techniques for optimally controlling a speed ratio, which states the ratio of the transmission input to output speed, of an automobile continuously variable automatic transmission even under particular vehicle driving conditions, for example when restarting after the vehicle experiences wheel spin at drive road wheels during the starting period on uphill roads with wheel spin, or when restarting after the vehicle experiences wheel spin at drive wheels during the starting period on low-$\mu$ roads.

2. Description of the Prior Art

Japanese Patent Provisional Publication Nos. 8-178042 and 4-54371 have disclosed a belt-type continuously variable automatic transmission, often abbreviated to "CVT". Generally, the speed ratio of the CVT is electronically controlled in accordance with a predetermined speed-change pattern by means of an electronic transmission control unit. The predetermined speed-change pattern is pre-stored as a preprogrammed characteristic map in the memory (ROM) of the transmission control unit. A desired speed necessary for the speed-change control action is generally based on vehicle speed and engine load. As a control parameter corresponding to the vehicle speed, a rotational speed of the output shaft of the CVT (i.e., a drive-wheel speed) is generally used.

SUMMARY OF THE INVENTION

When the vehicle starts from the standstill state on low-$\mu$ roads, such as wet, icy, or snow roads, particularly when starting on low frictional roads or during uphill driving, there is a tendency for wheel spin to occur. Owing to the wheel spin, the drive-wheel speed rises rapidly, while the rise of vehicle speed is not so much. In spite of such less rise of the vehicle speed, the electronic transmission control unit begins to perform the speed-change control action according to the speed-change ratio based on the engine load and the drive-wheel speed (regarded as the vehicle speed), as if the actual vehicle speed rises rapidly. That is, the transmission control unit would generate an upshift command due to the rapid rise of drive-wheel speed. As a result of this, the speed ratio tends to unreasonably shift toward the minimum speed ratio line (or the highest-speed line) in the predetermined speed-change pattern. Under these conditions, if the accelerator pedal is released by the driver to prevent the undesired wheel spin occurring at the drive road wheels, the vehicle may come to a standstill without adequate return of the speed ratio of the CVT to a relatively large value closer to the maximum speed ratio line (or the lowest-speed line). Thus, the speed ratio tends to be fixed undesiredly to a relatively small speed ratio closer to the minimum speed ratio line. Assuming that the vehicle is restarted from the standstill state with the speed-change ratio fixed to a certain small value closer to the minimum speed ratio line, the vehicle cannot be easily restarted owing to the small speed ratio.

In an electronically-controlled continuously variable automatic transmission, it is desirable to provide a satisfactory speed ratio control action even under the previously-discussed particular vehicle driving conditions, such as when restarting on the uphill roads owing to wheel spin, or when restarting on low-$\mu$ roads, such as wet, icy, or snow roads, owing to wheel spin.

Accordingly, it is an object of the invention to provide a transmission control system of an automotive vehicle with a continuously variable automatic transmission which avoids the aforementioned disadvantages of the prior art.

In order to accomplish the aforementioned and other objects of the present invention, a transmission control system of an automotive vehicle with a continuously variable automatic transmission, comprises a transmission control system for an automotive vehicle with a continuously variable automatic transmission whose speed-change ratio is defined as a ratio of transmission input to output speed and is changeable continuously depending on vehicle speed and engine load, comprises a hydraulic actuator producing a regulated line pressure and a speed-change control pressure necessary to adjust the speed ratio hydraulically, and an electronic transmission control unit including a data processing section detecting an acceleration of a drive wheel of the vehicle, comparing the acceleration of the drive wheel to a predetermined acceleration value, and inhibiting an upshifting action by preventing a speed ratio of the continuously variable automatic transmission from being upshifted toward a speed ratio less than a predetermined upshift limiting threshold.

According to another aspect of the invention, a transmission control method of an automotive vehicle with a continuously variable automatic transmission whose speed-change ratio is defined as a ratio of transmission input to output speed and is changeable continuously depending on vehicle speed and engine load, comprising the steps of: detecting an acceleration of a drive wheel of the vehicle; comparing the acceleration of the drive wheel to a predetermined acceleration value; and inhibiting an upshifting action by preventing a speed ratio from being shifted toward a speed ratio less than a predetermined upshift limiting threshold.

DESCRIPTION OF THE PREFERRED EMBODIMENTS

Figure 1:
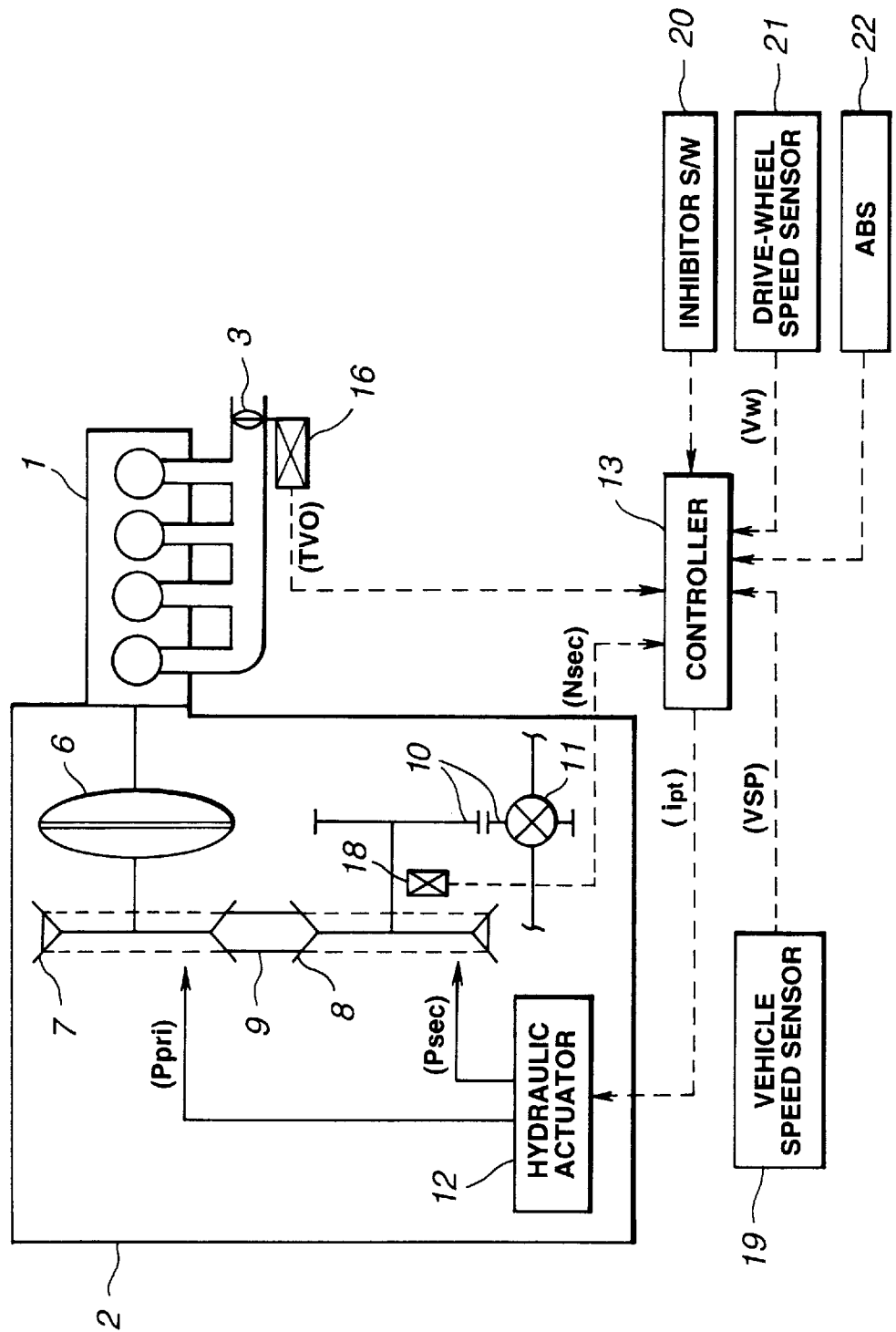
FIG. 1 is a system block diagram illustrating an embodiment of a speed-change control system according to the invention.
Figure 2:
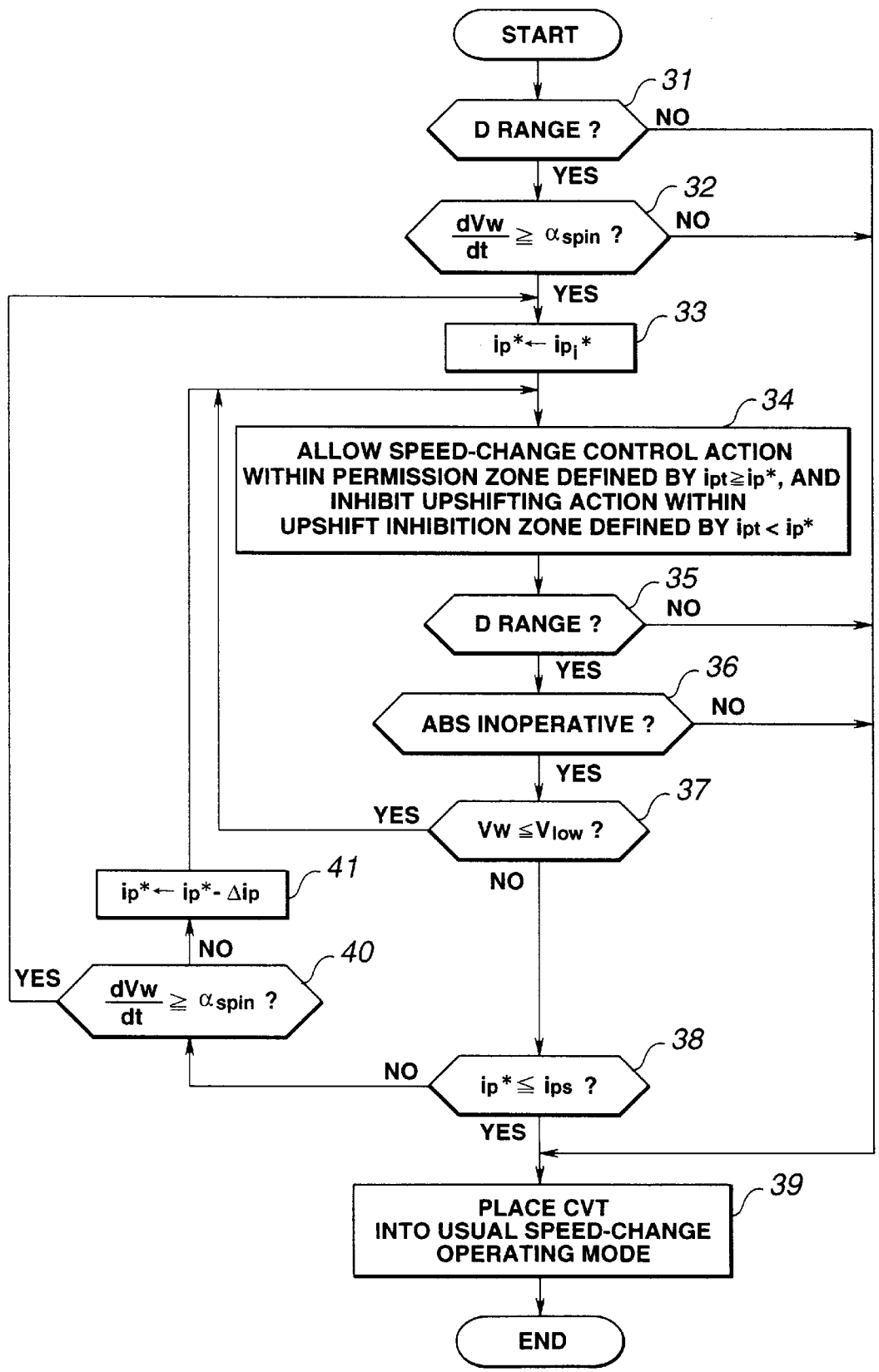
FIG. 2 is a flow chart of the speed-change control routine corresponding to the CVT control of the embodiment.
Figure 3:
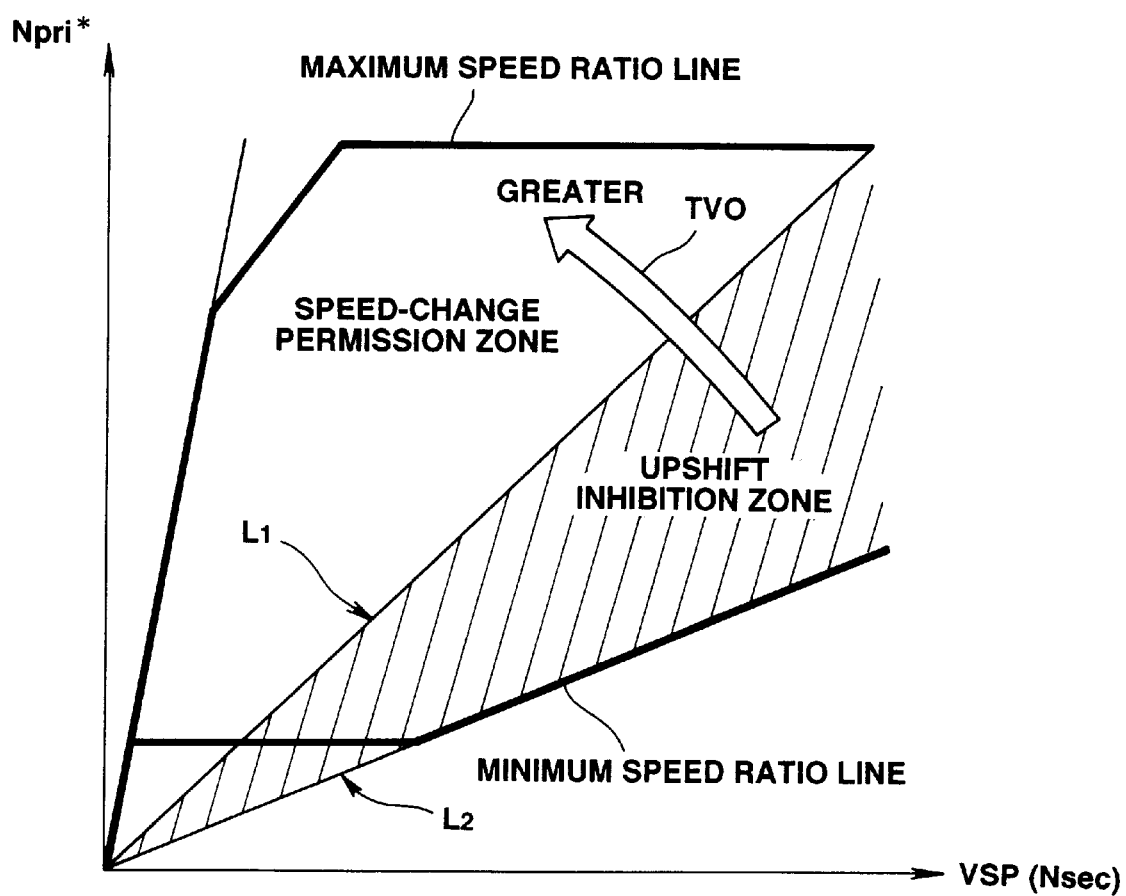
FIG. 3 is a characteristic map illustrating a predetermined speed-change pattern based on the target primary pulley rotational speed ($N_{pri}^*$) and the vehicle speed (VSP), which map is used in the automatic speed-change control routine shown in FIG. 2.

Referring now to the drawings, particularly to FIG. 1, there is shown a power train of an automotive vehicle employing a CVT control device and an electronic transmission control system,. necessary for the speed-change control executed by the CVT control of the invention. As seen in FIG. 1, the power train is constructed by an engine 1 and a continuously variable automatic transmission (CVT) 2. Reference sign 3 denotes a throttle valve 3. As may be appreciated from FIG. 1, the transmission control system of the invention is exemplified in the automotive vehicle with a belt-type continuously variable automatic transmission (CVT) which uses a segmented steel belt 9 running in a pair of variable-width pulleys 7 and 8, namely primary and secondary—driving and driven—pulleys whose effective diameters are continuously variable to provide varying pulley ratios (or speed ratios). The primary pulley 7 has a driven connection with the output shaft of the engine 1 via the torque converter 6. Torque transmitted from the primary pulley 7 to the secondary pulley 8 is transmitted via the final gear set 10 to the differential gear 11. Then, the torque transmitted to the differential gear 11 is further transmitted via axle drive shafts to the left and right drive wheels. As is generally known, the V groove of the primary pulley 7 is constructed by a stationary flange and an adjustable flange axially slidable on linear ball bearing splines for varying the width of the V groove of the primary pulley by hydraulic pressure $P_{pri}$ (often called a "primary pulley pressure" or a "speed-change control pressure"). Similarly, the V groove of the secondary pulley 8 is constructed by a stationary flange and an adjustable flange axially slidable on linear ball bearing splines for varying the width of the V groove of the secondary pulley by spring bias plus hydraulic pressure $P_{sec}$ (often called a "secondary pulley pressure" or a "regulated line pressure") in the smaller-diameter cylinder. The two hydraulic pressures $P_{pri}$ and $P_{sec}$ are generated from the hydraulic actuator 12 to the respective cylinders of the primary and secondary pulley units, in response to a command signal representative of a target speed ratio $i_{pt}$ which is calculated as a ratio ($N_{pri}*/N_{sec}$) of a desired primary pulley rotational speed $N_{pri}*$ to a secondary pulley rotational speed $N_{sec}$. A transmission controller 13 is provided for feedback-controlling, so that the actual speed ratio $i_p$ of the CVT 2 is adjusted to the target speed ratio $i_{pt}$. Generally, the controller 13 of the CVT control system comprises a microcomputer. As seen in FIG. 1, the input interface of the controller 13 receives various input-information signals from engine/vehicle sensors, namely a throttle opening sensor 16, a secondary pulley rotational speed sensor 18, a vehicle speed sensor 19, an inhibitor switch 20, a drive-wheel speed sensor 21, and an anti-skid brake system (ABS) 22. On the basis of these sensor signal values, the controller 13 determines or arithmetically calculates the target speed ratio $i_{pt}$. The throttle opening sensor 16 is provided for monitoring the throttle opening TVO of the throttle 3 of the engine 1. The vehicle speed sensor 19 is usually located near the transmission output shaft to detect the rotational speed of the transmission output shaft. Usually, the rotational speed of the transmission output shaft is used as a vehicle speed VSP. The inhibitor switch 20 is used to detect the more-recent selected range of the CVT 2. The drive-wheel speed sensor 21 is provided for detecting a drive-wheel speed $V_w$. Also, the input interface of the controller 13 is connected to the ABS system 22, for detecting whether the skid control system is in operative or in inoperative. In FIG. 3, there is shown the characteristic map illustrating the speed-change control characteristics which are achieved by the continuously variable automatic transmission control system of the present invention. In FIG. 3, the axis of ordinate indicates a target primary pulley rotational speed $N_{pri}*$, whereas the axis of abscissa indicates the vehicle speed VSP. Suppose that the vehicle speed (VSP) of the axis of abscissa is identical to the transmission output shaft speed $N_{sec}$, since the transmission output shaft speed $N_{sec}$ is generally regarded as the vehicle speed (VSP) or the vehicular body speed (VB) . In the map shown in FIG. 3, the upper polygonal line indicates the maximum speed ratio line, whereas the lower polygonal line indicates the minimum speed ratio line. The right-hand moderately inclined part of the lower polygonal line means a predetermined lower limit (the minimum speed ratio) of the speed-change ratio, whereas the left-hand steeply inclined part of the upper polygonal line means a predetermined upper limit (the maximum speed ratio) of the speed-change ratio. The intermediate zone, bordered between the upper and lower polygonal lines, corresponds to a usual speed-change control enable zone. As seen in FIG. 3, the speed-change line tends to shift from the lower polygonal line toward the upper polygonal line, such that the desired primary pulley rotational speed $N_{pri}*$ is set at a higher revolution speed, as the vehicle speed VSP ($N_{sec}$) increases. Additionally, as appreciated from the arrow indicated in FIG. 3, the speed-change line is designed to shift from the lower polygonal line toward the upper polygonal line in accordance with the increase in the engine load, commonly detectable as a throttle opening (TVO) or an accelerator pedal depression (APS). In the shown embodiment, the throttle opening TVO detected by the throttle opening sensor 16 is used as the engine load. As clearly seen in FIG. 3, in the transmission control system of the invention, an upshift inhibition zone, bordered by the two straight lines $L_1$ and $L_2$ and indicated by the hatched line, is provided in close vicinity to the minimum speed ratio line, so as to inhibit the upshifting action of the CVT within the upshift inhibition zone. In other words, within the upshift inhibition zone, only the upshifting action is prevented or inhibited, but the downshifting action is allowed. In order to ensure a proper driving torque under particular driving conditions, such as when restarting after starting on uphill roads with wheel spin, or when restarting after starting on low-μ roads with wheel spin, it is advantageous to provide the previously-noted upshift inhibition zone in close vicinity to the minimum speed ratio line (see the hatched zone close to the lower polygonal line of FIG. 3). In the transmission control method of the invention, either one of the usual speed-change operating mode and the upshift inhibition mode is suitably selected depending on predetermined necessary conditions, as will be more fully described later by reference to the flow chart shown in FIG. 2. In FIG. 3, the gradient ($N_{pri}*$/VSP) of the boundary line $L_1$ means a certain target speed ratio $i_{pt}$ (=$N_{pri}*/N_{sec}$), since a transmission output speed ($N_{sec}$) is generally used as the vehicle speed VSP. This certain target speed-change ratio $i_{pt}$ corresponding to the gradient of the boundary line $L_1$ (the upper limit of the upshift inhibition zone) is an upshift-inhibition zone upper threshold value $i_p*$ (simply an upshift limiting threshold value $i_p*$). Particularly, at the beginning of the upshift inhibition operating mode, the target speed-change ratio corresponding to the gradient of the boundary line $L_1$ means a predetermined initial value $i_{pi}*$ of the upshift limiting threshold $i_p*$. The lowermost straight line $L_2$ (the lower limit of the upshift inhibition zone) is identical to the right-hand inclined part of the lower polygonal line (the minimum speed ratio line). When the upshift inhibition mode is selected, the upshift limiting threshold $i_p*$ functions to prevent shifting of the speed ratio $i_p$ toward the minimum speed ratio side (overdrive) by preventing or inhibiting the upshifting action within the upshift inhibition zone. That is, the provision of the gradual relaxation or release (see the flow from step 38 via step 40 to step 41) of the upshift limiting threshold is effective to prevent the rapid shifting of the actual speed-change ratio $i_p$ toward the minimum speed ratio side (overdrive), and consequently to attain the speed-change control action with as small shift-shock as possible. In the shown embodiment, at the beginning of the upshift inhibition mode, the value of the threshold $i_p^*$ is first set at the initial value $i_{pi}^*$ that provides a driving torque enough to travel on uphill road having a desired gradient. As seen in steps 31 and 32, the upshift limitation mode initiates, when the following specified conditions are satisfied. One specified condition is a condition where the shift lever position of the continuously variable automatic transmission is the D range. The other specified condition is a condition where the wheel acceleration dVw/dt (time rate of change of the drive-wheel speed Vw) is above a predetermined wheel-spin threshold value $\alpha_{spin}$. The predetermined wheel-spin threshold $\alpha_{spin}$ is set at a value greater than an acceleration value corresponding to the standard longitudinal acceleration of the vehicle, which acceleration is produced during the usual vehicle driving. In the shown embodiment, although the two necessary conditions (that is, the CVT put into the D rangeand dVw/dt$\geq\alpha_{spin}$) are used to initiate the upshift inhibition mode (or to provide the upshift inhibition zone), according to the transmission control system of the invention, at least the latter necessary condition of dVw/dt$\geq\alpha_{spin}$ is required to initiate the upshift inhibition mode. As described in detail later, in the shown embodiment of the transmission control system according to the invention, the automatic speed-change control routine of FIG. 2 is so designed that the upshift limitation or the upshift inhibition for the speed-change ratio $i_p$ is gradually relaxed or released by the flow from step 38 via step 40 to step 41. That is, during the gradual relaxation mode for upshift limitation, the value of the upshift limiting threshold $i_p^*$ is gradually reduced from the initial set value $i_p^*$ toward a preset low value $i_{ps}$ substantially corresponding to the minimum speed ratio line (the lowermost straight line $L_2$ corresponding to the lower limit of the upshift inhibition zone), so that the upshift inhibition zone is gradually decreased or narrowed. It is preferable that the gradual relaxation or moderately decrease in the upshift limiting threshold $i_p^*$ is not made under a particular condition where the vehicle is running at an excessively low speed that the drive-wheel speed Vw, regarded as the vehicle speed (VSP) or the vehicular body speed (VB), is below a predetermined low speed. This is because the stopping time of the vehicle is very short during driving (during crawling) at excessively low vehicle speeds. The predetermined low speed means a predetermined vehicle-speed threshold value $V_{low}$ necessary to determine whether the vehicle is substantially in the standstill state. The predetermined threshold value $V_{low}$ will be hereinafter referred to as a "predetermined standstill-decision vehicle speed". The electronic transmission control unit decides that the vehicle is substantially in the standstill state, when the drive-wheel speed Vw is below the predetermined threshold value $V_{low}$. Thus, the driver must restart the vehicle, after the accelerator pedal is released once owing to the occurrence of wheel-spin which may occur at the drive wheels under particular operating conditions, for example during uphill driving, or during starting period on low-$\mu$ roads. In order for the vehicle to easily restart on the low-$\mu$ road or on the uphill road, where the vehicle may experience wheel spin at drive wheels, the vehicle requires the reasonable magnitude of driving torque transmitted to the drive wheels. To achieve this, a comparatively large speed ratio $i_p$ is required during the restarting period on the uphill road or on the low-$\mu$ road. Thus, in order to prevent the speed ratio $i_p$ from shifting toward the preset value $i_{ps}$ (overdrive) during driving (during crawling) at an excessively low vehicle speed below the predetermined standstill-decision threshold $V_{low}$, it is advantageous to inhibit the previously-noted gradual relaxation in the upshift limitation and to keep the upshift inhibition mode (see the flow from step 37 to step 34 in FIG. 2), when the vehicle is substantially in the standstill state. Furthermore, in the transmission control system according to the invention, as seen from step 36 in FIG. 2, the upshift limitation (the upshift inhibition) is forcibly removed or released completely rapidly when the anti-skid brake system (ABS) is in the operative state, since the wheel speed can be quickly recovered during skid control (ABS control) by way of the decreased speed-change ratio, resulting from the forcible release of upshift inhibition (see the flow from step 36 to step 39 in FIG. 2). As seen from the viewpoint of the skid control, it is advantageous to rapidly stop the gradual relaxation in upshift inhibition during the skid control. Details of the automatic transmission control routine based on the system according to the invention are described hereunder with reference to the flow chart of FIG. 2. The arithmetic processing (the automatic transmission control routine) shown in FIG. 2 is executed as time-triggered interrupt routines to be triggered every predetermined time intervals, such as 10 msec.

In step 31, a test is made to determine whether the selected range of the CVT is "D". When the answer to step 31 is in the negative (NO), that is, when either one of the other ranges (e.g., L range, P range, N range) except the D range is selected, the routine jumps to step 39. In step 39, the usual speed-change control action (or the usual speed-change operating mode) is performed. Conversely, when the answer to step 31 is in the affirmative (YES), the routine proceeds to step 32. In step 32, the acceleration $\alpha(=dVw/dt)$ of the drive wheel is compared to a predetermined acceleration value $\alpha_{spin}$. When the answer to step 32 is affirmative (YES), that is, in case of dVw/dt$\geq\alpha_{spin}$, step 33 occurs. In step 33, the upshift limiting threshold $i_p^*$ is set at the predetermined initial set value $i_{pi}^*$. Then, the upshift inhibition mode is entered at step 34. In step 34, the usual speed-change control action is allowed within the speed-change control action permission zone defined by $i_{pt}\geq i_p^*$, whereas only the upshifting action is inhibited within the upshift inhibition zone defined by $i_{pt}<i_p^*$. During the starting period of the vehicle, the speed ratio $i_p$ (or the target speed ratio $i_{pt}$) is first set essentially at the maximum speed ratio identical to the maximum gradient of the upper polygonal line of FIG. 3. Thereafter, the target speed ratio $i_{pt}$ tends to gradually reduce in accordance with the increase in the wheel speed Vw and the increase in the vehicle speed VSP (the vehicular body speed VB). Under these conditions, if the two necessary conditions (i.e., the CVT put into the D range and dVw/dt$\geq\alpha_{spin}$) are satisfied, the upshift inhibition mode initiates through step 34. That is, the speed-change control action that the target speed ratio $i_{pt}$ becomes less than the threshold $i_p^*$, is prevented or inhibited by the upper limit $L_1$ (the threshold $i_p^*$) of the upshift inhibition zone, as soon as the target speed ratio $i_{pt}$ is reduced down to the threshold $i_p^*$. Particularly during the starting period on the low-$\mu$road or on the uphill road, the provision of step 34 is effective to avoid the speed ratio $i_p$ from entering into the upshift inhibition zone defined by the two lines $L_1$ (determined by the threshold $i_p^*$) and $L_2$ (including the right-hand inclined part of the lower polygonal line). Thereafter, in step 35, the same test as step 31 is made to check whether the current selected range is maintained in the D range. When the answer to step 35 is negative, the routine proceeds to step 39 at which the usual speed-change operating mode is executed. On the contrary, when the answer to step 35 is affirmative, step 36 occurs. In step 36, a check is made to determine whether the anti-skid brake system (ABS) is in its inoperative state. When the answer to step 36 is negative, the routine flows to step 39. On the contrary, when the answer to step 36 is affirmative, that is, when the ABS is in the inoperative state, step 37 occurs. In step 37, a test is made to determine whether the drive-wheel speed Vw is below the predetermined threshold value $V_{low}$. When the answer to step 37 is affirmative, that is, in case of $Vw>V_{low}$, the routine returns from step 37 to step 34 to continue the upshift inhibition mode. Conversely, when the answer to step 37 is negative, that is, in case of $Vw>V_{low}$, the routine flows to step 38. In step 38, the threshold $i_p^*$ is compared to a predetermined small speed ratio $i_{ps}$. The predetermined small speed ratio $i_{ps}$ is preset at a value substantially corresponding to the minimum speed ratio line (the lowermost straight line $L_2$ corresponding to the lower limit of the upshift inhibition zone). As may be appreciated, the difference between the threshold $i_p^*$ and the preset small speed ratio $i_{ps}$ defines a releasing time duration at the gradual relaxation mode for upshift limitation. The proper setting of the predetermined small speed ratio $i_{ps}$ is important to prevent rapid release in the previously-discussed upshift limitation, and to avoid shift-shock resulting from the rapid shifting of the speed ratio $i_p$ toward the minimum speed ratio. Also, the proper setting of the preset initial value of the threshold $i_p^*$ is important to ensure a reasonable upshift limiting action under the previously-discussed particular driving conditions, and to insure adequate recovery of the speed ratio of the CVT toward a value closer to the maximum speed ratio line. Although the predetermined small speed ratio $i_{ps}$ can be set at a value corresponding to the minimum speed ratio line (the lowermost straight line $L_2$), there is a possibility that the recovery of the speed ratio $i_p$ to the usual speed ratio given during the usual speed-change operating mode is retarded. For the reasons set forth above, it is more preferable to set the predetermined small speed ratio $i_{ps}$ at a value somewhat lower than the minimum speed ratio corresponding to the minimum speed ratio line ($L_2$). In step 38, when the answer to step 38 is negative, that is, when the predetermined threshold $i_p^*$ is below the predetermined small speed ratio $i_{ps}$, the routine proceeds to step 40. In step 40, the same check as step 32 is made. In step 40, when the condition $dVw/dt \geq \alpha_{spin}$ is satisfied, the routine flows to step 33 and as a result the upshift limiting threshold $i_p^*$ is set again at the initial set value $i_{pi}^*$. This step 40 is effective to prevent the previously-noted gradual releasing mode (or the gradual releasing control) for the upshift limiting threshold $i_p^*$ and to continue the upshift inhibition mode with the upshift limiting threshold $i_p^*$ set at the initial set value $i_{pi}^*$, when wheel-spin reoccurs. Returning to step 38, when the answer to step 38 is affirmative, that is, in case of $i_p^* \leq i_{ps}$, the routine proceeds to step 39. When the answer to step 40 is negative, that is, when the condition of $dVw/dt<\alpha_{spin}$ is satisfied, step 41 occurs. In step 41, the current value of the threshold $i_p^*$ is decreased or decremented by a predetermined decrement or a predetermined time rate-of-change $\Delta i_p$ of the threshold value $i_p^*$. Owing to repetition of the loop defined by the flow from step 34 through steps 35, 36, 37, 38, 40 and 41, again to step 34, the threshold value $i_p^*$ can be gradually reduced toward the predetermined small speed ratio $i_{ps}$, so that the upper limit $L_1$ of the upshift inhibition zone is shifted toward the smaller limit defined by the predetermined small speed ratio $i_{ps}$, and thus the upshift inhibition zone is gradually narrowed or reduced. In this manner, the upshift inhibition mode can be gradually relaxed or released by way of repetition of the loop defined by the flow from step 34 through steps 35, 36, 37, 38, 40 and 41, again to step 34. On the other hand, by way of repetition of the loop defined by the flow from step 34, through steps 35, 36 and 37, again to step 34, the upshift inhibition mode is continued with no change in the threshold $i_p^*$.

Figure 4:
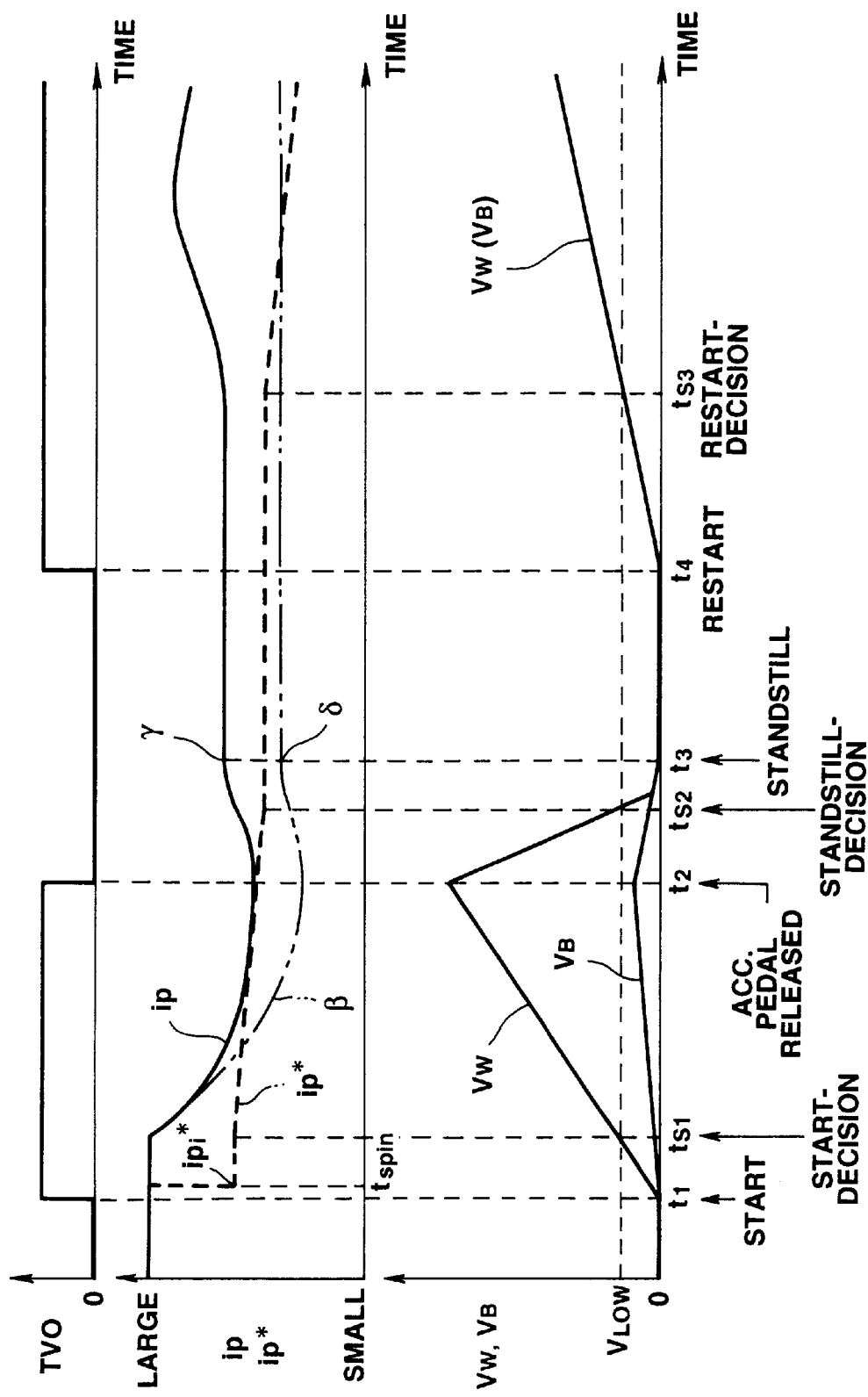
FIGS. 4 and 5 are timing charts, prepared to comparing the improved CVT control with the conventional CVT control under particular driving condition, that is, when restarting owing to wheel spin during the starting period on low-$\mu$ and uphill roads, and indicating their simulation results under the particular driving condition where the vehicle starts on low-$\mu$ and uphill roads, and then stops with the accelerator pedal released after the occurrence of wheel spin, and thereafter restarted.
Figure 5:
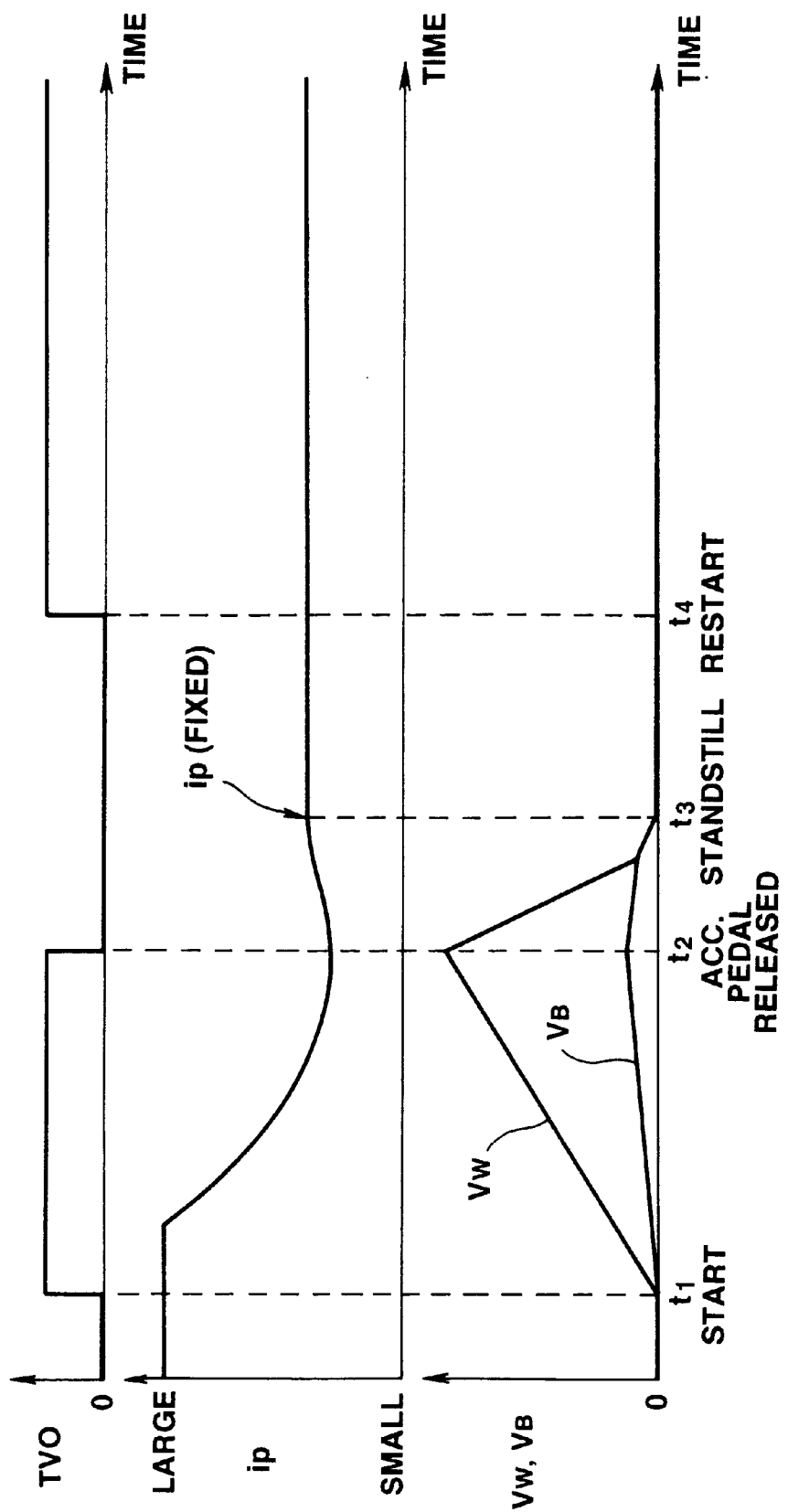

Referring now to FIGS. 4 and 5, there are simulation results representative of the relationship among the throttle opening TVO (considered to the engine load), the speed ratio $i_p$, the drive-wheel speed Vw, and the vehicular body speed $V_B$ (considered to be equivalent to the vehicle speed VSP and the transmission output shaft speed $N_{sec}$), respectively based on the improved CVT control and the conventional CVT control according to the invention. The simulation test is based on the assumption that wheel spin takes place at drive wheels during the starting period on the low-$\mu$ and uphill road and additionally the skid control system is in the inoperative state.

As seen in FIG. 5, according to the conventional CVT control, at the time $t_1$ when the vehicle is started with depression of the accelerator pedal under a condition where the CVT is put into the D range, the drive wheels begin to spin due to the low-$\mu$ and uphill road. Irrespective of when the actual vehicle speed $V_B$ is not so much owing to the wheel spin, the rotational speed of the secondary pulley (the transmission output shaft speed $N_{sec}$) rises rapidly. Thus, owing to the acceleration slip, the drive-wheel speed Vw begins to rise rapidly from the time $t_1$. Due to the rapid rise in the transmission output shaft speed $N_{sec}$, the conventional transmission controller performs a speed-change control, so that the speed ratio $i_p$ shifts toward a low speed ratio. At the time $t_2$ when the driver releases the accelerator pedal to avoid the wheel spin, the throttle opening TVO drops to a predetermined low value (0/8) corresponding to a substantially closed position of the throttle 3. Thus, the drive-wheel acceleration value $\alpha(=dVw/dt)$ shifts to the negative sign and the drive-wheel speed Vw reduces rapidly. As a result, the speed ratio $i_p$ begins to increase and the vehicle begins to decelerate from the time $t_2$. After this, the vehicle comes to a standstill at the time $t_3$, because the vehicle speed is excessively low due to the low friction coefficient of the low-$\mu$ and uphill road and the accelerator pedal is undepressed. In the standstill state, the change-speed control action is not performed due to the mechanism or construction of the CVT. Thus, after the vehicle is stopped once at the time $t_3$, the speed ratio $i_p$ remains unchanged and is fixed to a comparatively low value (closer to overdrive) with no return of the speed ratio $i_p$ to an adequate high value. Thereafter, when restarting with depression of the accelerator pedal at the time $t_4$, it is difficult to easily restart the vehicle on the low-$\mu$ and uphill road with the speed-change ratio fixed to the comparatively low value.

On the contrary, as seen in FIG. 4, according to the improved transmission control of the invention, when the vehicle is started at the time $t_1$ with the accelerator pedal depressed under a condition where the CVT is put into the D range, the drive wheels begin to spin due to the low friction factor of the low-$\mu$ and uphill road. Assuming that the acceleration $\alpha(=dVw/dt)$ of the drive wheel becomes above the predetermined acceleration value (the predetermined wheel-spin threshold value) $\alpha_{spin}$ with a brief response delay ($t_{spin}-t_1$) due to the rapid depression of the accelerator pedal at the time $t_{spin}$ just after the time $t_1$, the routine of FIG. 2 flows from step 32 to step 33. Thus, as soon as the condition of $dVw/dt \geq \alpha_{spin}$ is sensed at step 32, the upshift inhibition zone defined by $i_{pt} < i_p^*$ is provided. At this time $t_{spin}$, the threshold $i_p^*$ of the upshift inhibition zone is set at the predetermined initial value $i_{pi}^*$ (see step 33 of FIG. 2). The predetermined acceleration value $\alpha_{spin}$ can be hereinafter referred to as a "wheel-spin decision acceleration value". As indicated by the broken line in the intermediate timing chart for variations in the speed-change ratio $i_p$ and changes in the threshold $i_p^*$ of the upshift inhibition zone, the threshold $i_p^*$ of the upshift inhibition zone is held at the initial set value $i_{pi}^*$ for the time period from the time $t_{spin}$ to the time $t_{s1}$, until the drive-wheel speed Vw exceeds the predetermined standstill-decision vehicle speed $V_{low}$. The time $t_{s1}$ will be referred to as a "start-decision times", since the controller determines that the vehicle begins to run when the drive-wheel speed Vw exceeds the standstill-decision vehicle speed $V_{low}$. The time $t_{s2}$ when the drive-wheel speed Vw becomes below the standstill-decision vehicle speed $V_{low}$ will be referred to as a "standstill-decision time". The time $t_{s3}$ when the vehicle is restarted after the vehicle comes to the standstill state at the time $t_3$, will be referred to as a "restart-decision time". As seen in FIG. 4, according to the flow from step 37 through steps 38, 40, 41, 34, 35 and 36 again to step 37, for the time period from the start-decision time $t_{s1}$ to the standstill-decision time $t_2$, the threshold $i_p^*$ of the upshift inhibition zone is gradually moderately reduced from the initial set value $i_{pi}^*$ with the predetermined decrement $\Delta i_p$ (see step 41). Thereafter, the threshold $i_p^*$ of the upshift inhibition zone is held at the value obtained at the standstill-decision time $t_2$, until the restart-decision time has been reached. After the restart-decision time $t_{s3}$, the threshold $i_p^*$ of the upshift inhibition zone is moderately reduced again with the predetermined decrement $\Delta i_p$ (see step 41). Finally, the threshold $i_p^*$ of the upshift inhibition zone is reduced down to the preset low value $i_{ps}$. In this manner, the controlled threshold $i_p^*$ of the upshift inhibition zone properly inhibits or limits the upshift action as indicated by the broken line of the intermediate timing chart of FIG. 4. Note that the CVT control system of the present invention ensures an effective upshift inhibition action during the starting period on the low-$\mu$ and uphill road (particularly see the time period between $t_1$ and $t_2$). The two-dotted line $\beta$ indicated in the intermediate timing chart of FIG. 4 corresponds to the characteristic curve of the speed ratio $i_p$ indicated by the solid line in the intermediate timing chart of FIG. 5. As can be appreciated from the two-dotted line $\beta$, the speed ratio $i_p$ tends to upshift rapidly toward overdrive, since the conventional system does not provide any upshift inhibition action. In case of the conventional system with no upshift inhibition control, as indicated by the two-dotted line, the speed ratio $i_p$ is fixed to or held at a comparatively low after the accelerator pedal is released at the time $t_2$. On the other hand, in case of the improved system of the present invention with upshift inhibition control, as indicated by the solid line of the central timing chart of FIG. 4, the speed ratio $i_p$ can be held at a comparatively high speed ratio $\gamma$ remarkably higher than the previously-discussed speed ratio $\delta$ by virtue of the proper upshift inhibition control, after the accelerator pedal is released at the time $t_2$. This is because the drop of the speed ratio $i_p$ is limited to the threshold $i_p^*$ of the upshift inhibition zone, as remarkably seen from the substantially middle time period of $t_{s1}$ and $t_{s2}$ (see the line segment of the speed ratio ($i_p$) indicative solid line conforming to the threshold ($i_p^*$) indicative broken line). That is, the smaller limit of the speed ratio $i_p$ is limited to the controlled threshold $i_p^*$ of the upshift inhibition zone, so that the speed ratio $i_p$ is prevented or inhibited from being shifted toward the highest-speed side (overdrive). Owing to the speed ratio $i_p$ held at the comparatively high value, when the accelerator pedal is depressed again at the time $t_4$, the vehicle can be easily restarted even on the low-$\mu$ and uphill road. After restarting at the time $t_4$, when the vehicular body speed VB exceeds the predetermined standstill-decision vehicle speed $V_{low}$ at the restart-decision time $t_3$, the routine proceeds from step 37 to step 38. Assuming that the condition of $i_p^* \leq i_{ps}$ is not yet satisfied, the routine flows from step to step 40. When the drive-wheel acceleration value $\alpha(=dVw/dt)$ is less than the wheel-spin decision acceleration value $\alpha_{spin}$, the routine proceeds from step 40 via step 41 to step 34. Thus, after the restart-decision time $t_{s3}$, the threshold value $i_p^*$ of the upshift inhibition zone is decremented by the predetermined decrement $\Delta i_p$ Suppose that the conditions of steps 35, 36, and 36 are all satisfied and the conditions of steps 37 ($Vw \leq V_{low}$) and 40 ($dVw/dt \geq \alpha_{spin}$) are unsatisfied for a while from the time $t_3$, the loop defined by steps 34, 35, 36, 37, 38, 40, and 41 is repeated. Therefore, the threshold value $i_p^*$ is gradually moderately reduced down to the preset small value $i_{ps}$. In this manner, the previously-discussed upshift inhibit gradual-releasing action begins again from the time $t_{s3}$. After this, as soon as the threshold value $i_p^*$ becomes below the preset low value $i_{ps}$, the routine jumps from step 38 to step 39, so as to execute the usual speed-change operating mode. In this manner, the routine terminates.

In the embodiment, the predetermined wheel-spin decision acceleration value $\alpha_{spin}$ is set at a lower limit of a high, unrealizable acceleration range which lower limit is determined for all sorts of automotive vehicles. The accuracy of estimation of occurrence of wheel-spin, based on the condition of $dVw/dt \geq \alpha_{spin}$ (see steps 32 and 40) is enhanced. Thus, the upshift inhibiting action can be timely effectively executed, without sacrificing fuel economy. Also, in the embodiment, the initial set value $i_{pi}^*$ of the threshold $i_p^*$ of the upshift inhibition zone is set at a critical speed ratio enough to produce a driving torque necessary to start the vehicle under a predetermined condition defined by an uphill road having a specified friction coefficient and a specified rising gradient. The frequency of the upshift inhibiting action is reduced to the minimum. Only when the upshift inhibiting action is required actually, the upshift inhibition mode can be timely performed. This prevents unreasonably increased fuel consumption and avoids unreasonably increased noise resulting from the use of high engine speed range during the upshift inhibition mode. Furthermore, as appreciated from the time period between $t_{s1}$ and $t_{s2}$, and from the time point $t_3$, the gradual relaxation mode for upshift limitation (upshift inhibition) is executable with the predetermined decrement $\Delta i_p$. This avoids a rapid change in the speed ratio $i_p$. Moreover, during the standstill decision when the answer to step 37 is affirmative (YES) and the condition of $Vw \leq V_{low}$ is satisfied, the loop defined by the flow from step 34, through steps 35, 36 and 37, again to step 34 is repeated, and thus the threshold $i_p^*$ of the upshift inhibition zone is held at a certain value obtained or set at the standstill-decision time $t_2$, as seen from the time period between $t_{s2}$ and $t_{s3}$. The recovery of the threshold $i_p^*$ to the preset low value $i_{ps}$ is inhibited or prevented. In this manner, the gradual relaxation mode for upshift inhibition can be timely temporarily stopped by the provision of step 37, to attain a smooth restart after the vehicle has been stopped once due to wheel spin. Although it is not shown in the timing chart of FIG. 4, as appreciated from the flow from step 40 to step 33, when the drive-wheel acceleration value $\alpha(=dVw/dt)$ exceeds the predetermined wheel-spin decision acceleration value $\alpha_{spin}$ again before the threshold $i_p^*$ of the upshift inhibition zone is recovered to the predetermined small value $i_{ps}$ (corresponding to substantially overdrive), in the transmission controller 13, the routine proceeds from step 40 to step 33, so that the threshold value $i_p*$ is reset to the initial set value $i_{pi}*$. This facilitates restart even when the wheel spin reoccurs during the gradual relaxation mode for upshift inhibition. Moreover, as appreciated from the flow from step 36 to step 39, the controller rapidly releases the upshift inhibition mode so that the operating mode is rapidly shifted to the usual speed-change operating mode to permit shifting of the speed ratio to the minimum speed ratio line (overdrive) during the skid control. The adjustment of the speed ratio to such a comparatively small value is effective to reduce the rotational inertia of the drive wheels. Therefore, it is advantageous to switch from the upshift inhibition mode to the usual speed-change operating mode, when the skid control begins due to wheel lock (so-called deceleration slip) resulting from unreasonably hard braking action and thus the wheel-cylinder pressure of the road wheel subjected to the skid control decreases in accordance with the pressure-reduction mode. This facilitates recovery of the drive wheels to their rotating states. The system of the invention can timely performs the upshift inhibition mode without sacrificing the performance of skid control of the ABS system.

The contents of Application No. TOKUGANHEI 9-200029, filed Jul. 25, 1997, in Japan is hereby incorporated by reference.

In the embodiment, although the transmission control system of the invention is exemplified in a belt type continuously variable automatic transmission (CVT), it will be appreciated that the technique of the invention is applicable to the other types of a continuously variable transmission, such as a toroidal CVT. Typical details of such a toroidal CVT, being set forth, for example, in U.S. Pat. No. 4,955, 246 issued Sep. 11, 1990 to Masaki Nakano and assigned to the assignee of the present invention, the teaching of which are hereby incorporated by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A transmission control system for an automotive vehicle with a continuously variable automatic transmission whose speed ratio is defined as a ratio of transmission input to output speed and is changeable continuously depending on vehicle speed and engine load, comprising:

a hydraulic actuator producing a regulated line pressure and a speed change control pressure necessary to adjust the speed ratio hydraulically; and an electronic transmission control unit including a data processing section that performs:
 (a) detecting an acceleration of a drive wheel of the vehicle;
 (b) detecting a vehicle speed;
 (c) controlling the transmission such that an upshifting action occurs by decreasing the speed ratio as the vehicle speed increases;
 (d) comparing the acceleration of the drive wheel to a predetermined acceleration value; and
 (e) inhibiting the upshifting action by preventing the speed ratio of the continuously variable transmission from being upshifted toward a speed ratio less than a predetermined upshift limiting threshold when the acceleration of the drive wheel is greater than the predetermined acceleration value.

2. The transmission control system as claimed in claim 1, wherein the predetermined acceleration value ($\alpha_{spin}$) is set at a lower limit of a high unrealizable acceleration range.

3. The transmission control system as claimed in claim 1, wherein an initial set value ($i_{pi}*$) of the predetermined upshift limiting threshold ($i_p*$) is set at a critical speed ratio enough to produce a driving torque necessary to start the vehicle under a predetermined condition defined by an uphill road having a specified friction coefficient and a specified rising gradient.

4. The transmission control system as claimed in claim 1, wherein the data processing section:
 (f) gradually releasing inhibition of the upshifting action by moderately decreasing the predetermined upshift limiting threshold ($i_p*$) by a predetermined time rate-of-change ($\Delta i_p$), so that the predetermined upshift limiting threshold ($i_p*$) is moderately reduced and recovered to a predetermined small speed ratio ($i_{ps}$).

5. The transmission control system as claimed in claim 4, wherein the predetermined small speed-change ratio ($i_{ps}$) is a value substantially corresponding to a highest-speed transmission gear ratio.

6. The transmission control system as claimed in claim 4, wherein the data processing section:
 (g) detecting a vehicle speed (VSP); and
 (h) inhibiting the gradually releasing of inhibition of the upshifting action, when the vehicle speed (VSP) is below a predetermined low vehicle speed ($V_{low}$) necessary to determine whether the vehicle is substantially in a standstill state.

7. The transmission control system as claimed in claim 4, wherein the predetermined upshift limiting threshold ($i_p*$) is reset to the initial set value ($i_{pi}*$), when the acceleration ($dVw/dt$) of the drive wheel exceeds the predetermined acceleration value ($\alpha_{spin}$) again before the predetermined upshift limiting threshold ($i_p*$) is recovered to the predetermined small speed ratio ($i_{ps}$).

8. The transmission control system as claimed in claim 1, wherein the data processing section:
 (f) releasing inhibition of the upshifting action, when an anti-skid brake system is in an operative state.

9. A transmission control method of an automotive vehicle with a continuously variable automatic transmission whose speed ratio is defined as a ratio of a transmission input to output speed and is changeable continuously depending on vehicle speed and engine load, comprising the steps of:
 (a) detecting an acceleration of a drive wheel of the vehicle;
 (b) detecting a vehicle speed;
 (c) controlling the transmission such that an upshifting action occurs by decreasing the speed ratio as the vehicle speed increases;
 (d) comparing the acceleration of the drive wheel to a predetermined acceleration value; and
 (e) inhibiting the upshifting action by preventing the speed ratio from being shifted toward a speed ratio less than a predetermined upshift limiting threshold when the acceleration of the drive wheel is greater than the predetermined acceleration value.

10. The transmission control method as claimed in claim 9, wherein the predetermined acceleration value ($\alpha_{spin}$) is set at a lower limit of a high unrealizable acceleration range.

11. The transmission control method as claimed in claim 9, wherein an initial set value ($i_{pi}^*$) of the predetermined upshift limiting threshold ($i_p^*$) is set at a critical speed ratio enough to produce a driving torque necessary to start the vehicle under a predetermined condition defined by an uphill road having a specified friction coefficient and a specified rising gradient.

12. The transmission control method as claimed in claim 9, wherein the upshift inhibiting step (e) comprises providing an upshift inhibition zone in close vicinity to a predetermined minimum speed ratio line, and an upper limit of the upshift inhibition zone corresponds to the predetermined upshift limiting threshold ($i_p^*$).

13. The transmission control method as claimed in claim 12, wherein the upshift inhibiting step (c) comprises calculating a target speed ratio ($i_{pt}$) as a ratio of a target transmission input shaft speed ($N_{pri}^*$) based on vehicle speed and engine load to a transmission output shaft speed ($N_{sec}$), comparing the target speed ratio ($i_{pt}$) with the predetermined upshift limiting threshold ($i_p^*$) of the upshift inhibition zone to allow a speed-change control action within a speed-change control action permission zone defined by $i_{pt} \geq i_p^*$, where $i_{pt}$ is the target speed ratio and $i_p^*$ is the upper limit of the upshift inhibition zone, and to inhibit the upshifting action within the upshift inhibition zone defined by $i_{pt} < i_p^*$.

14. The transmission control method as claimed in claim 11, comprising the additional steps of (f) detecting a vehicle speed (VSP), and (g) gradually releasing inhibition of the upshifting action when the vehicle speed (VSP) is above a predetermined low vehicle speed ($V_{low}$) necessary to determine whether the vehicle is substantially in a standstill state after the upshift inhibiting step (e).

15. The transmission control method as claimed in claim 14, comprising the additional step (h) of inhibiting the gradually releasing step (g) when the vehicle speed (VSP) is below the predetermined low vehicle speed ($V_{low}$), thus recovering the upshift inhibiting step (e).

16. The transmission control method as claimed in claim 14, wherein the gradually releasing step (g) comprises comparing the upshift limiting threshold ($i_p^*$) with a predetermined small speed ratio ($i_{ps}$) preset at a value substantially corresponding to the predetermined minimum speed ratio line, and gradually decreasing the upshift limiting threshold ($i_p^*$) by a predetermined time rate-of-change ($\Delta i_p$), until the upshift limiting threshold ($i_p^*$) reaches a value below the predetermined small speed ratio ($i_{ps}$).

17. The transmission control method as claimed in claim 16, comprising the additional step (h) of resetting the predetermined upshift limiting threshold ($i_p^*$) to the initial set value ($i_{pi}^*$), when the acceleration (dVw/dt) of the drive wheel exceeds the predetermined acceleration value ($\alpha_{spin}$) again before the predetermined upshift limiting threshold ($i_p^*$) is recovered to the predetermined small speed ratio ($i_{ps}$).

18. The transmission control method as claimed in claim 16, comprising the additional step (h) of completely releasing inhibition of the upshifting action during skid control.

* * * * *